United States Patent [19]

Kadowaki et al.

[11] Patent Number: 5,296,694
[45] Date of Patent: Mar. 22, 1994

[54] OPTICAL PICK-UP HEAD APPARATUS WITH OPTICAL MEANS HAVING POLARIZATION ANISOTROPY

[75] Inventors: Shin-ichi Kadowaki, Osaka; Yoshiaki Komma, Kyoto; Seiji Nishino; Hiroaki Yamamoto, both of Osaka, all of Japan

[73] Assignee: Matsushita Electric Industrial Co., Ltd., Osaka, Japan

[21] Appl. No.: 963,474

[22] Filed: Oct. 21, 1992

[30] Foreign Application Priority Data

Mar. 31, 1992 [JP] Japan .................. 4-076693

[51] Int. Cl.⁵ ............................................ G01J 1/20
[52] U.S. Cl. ................................. 250/201.5; 369/13
[58] Field of Search ............... 250/201.5, 202, 201.2; 369/44.12, 44.11, 110, 112, 120, 13; 359/3, 12, 30, 7, 15, 327, 238, 285; 372/21, 32, 99, 33

[56] References Cited

U.S. PATENT DOCUMENTS

| | | |
|---|---|---|
| 4,665,310 | 5/1987 | Heemskerk . |
| 4,774,615 | 9/1988 | Revelli et al. .................. 369/13 |
| 4,785,438 | 11/1988 | Mizunoe ...................... 369/110 |
| 4,812,682 | 3/1989 | Holmes ........................ 359/327 |
| 4,929,823 | 5/1990 | Kato et al. . |
| 4,959,821 | 9/1990 | Morimoto et al. . |
| 4,995,685 | 2/1991 | Armstrong et al. ............ 359/12 |
| 5,173,885 | 12/1992 | Iiyori et al. ................... 369/13 |

FOREIGN PATENT DOCUMENTS

| | | |
|---|---|---|
| 0179429 | 4/1986 | European Pat. Off. . |
| 0285126 | 10/1988 | European Pat. Off. . |
| 0309675 | 4/1989 | European Pat. Off. . |
| 0322714 | 7/1989 | European Pat. Off. . |
| 59-157856 | 9/1984 | Japan . |
| 60-234253 | 11/1985 | Japan . |
| 63-018550 | 1/1988 | Japan . |
| 63-26604 | 2/1988 | Japan . |
| 63-241735 | 10/1988 | Japan . |
| 1-144233 | 6/1989 | Japan . |

*Primary Examiner*—David C. Nelms
*Assistant Examiner*—Que T. Le
*Attorney, Agent, or Firm*—Lowe, Price, LeBlanc & Becker

[57] ABSTRACT

The present invention relates to an optical pick-up head apparatus capable of recording, reproducing, or erasing optical information, and provides an optical pick-up head apparatus which can detect signals in a stable and good condition. A Faraday rotator 20 is disposed on an optical path between a polarized beamsplitter 55 and a polarized beamsplitter 53 so as to rotate polarization directions of a beam 6 emitted from a semiconductor laser source 2 and a beam 6 reflected back at a magneto-optical recording medium 4. A beam passing through the polarized beamsplitter 53 is received by a photodetector unit 83 to detect information signals and a reflected beam from the polarized beamsplitter 53 is received by a photodetector unit 84 to detect focusing- and tracking-error signals. Accordingly, it becomes possible that light quantity supplied to the photodetector unit 83 is adjusted to the optimum amount capable of adequately detecting the information signal and further all the remaining light quantity is supplied to the photodetector unit 84. Therefore, there is no uselessness in the detection of light. That is, both the focusing (or tracking)-error signal and the information signal can be respectively detected with high intensity and excellent S/N ratio. Consequently, it becomes possible to provide an optical pick-up head apparatus assuring very high reliability.

19 Claims, 8 Drawing Sheets

OPTICAL PICK-UP HEAD APPARATUS WITH OPTICAL MEANS HAVING POLARIZATION ANISOTROPY

BACKGROUND OF THE INVENTION

1. Field of the Invention

The present invention relates to an optical pick-up head apparatus capable of recording, reproducing, or erasing optical information memorized on a magneto-optical recording medium such as an optical disk or an optical card.

2. Description of the Prior Art

Recently, a magneto-optical disk system for recording information on the magneto-optical recording medium has become popular and has been practiced in various ways. Furthermore, many kinds of optical systems have been proposed as an optical pick-up head apparatus which can correctly read and write information from and into the magneto-optical recording medium.

Figure 7:
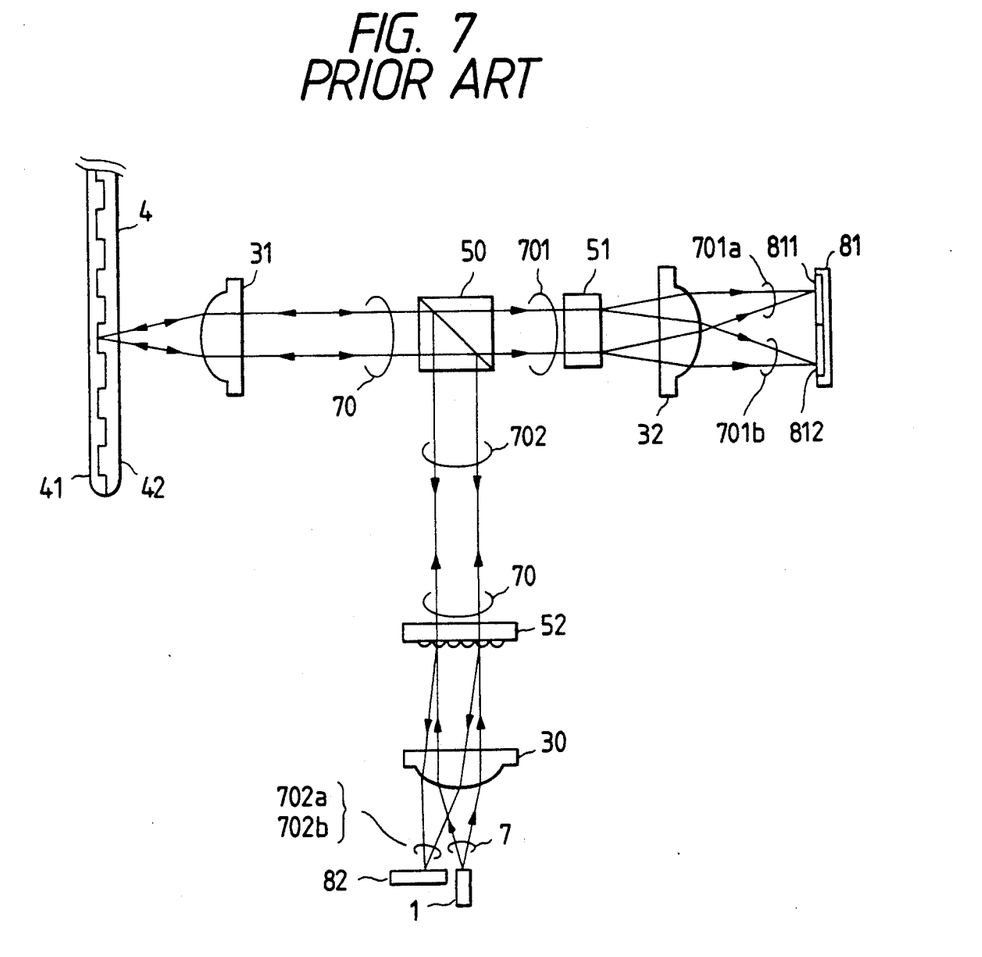
FIG. 7 is a view showing a schematic constitution of a conventional optical pick-up head apparatus.

FIG. 7 is a schematic view showing a constitution of one example of a conventional optical pick-up head apparatus. A spherical beam 7 emitted from a semiconductor laser source 1 enters a collimating lens 30 and, then, is converted into a parallel beam through this collimating lens 30. This parallel beam is further entered into a holographic optical element 52 and, then, a plurality of diffraction beams are generated.

On the forward optical path leading to a magneto-optical recording medium 4 from the semiconductor laser source 1, the 0-order diffraction beam 70 passing through the holographic optical element 52 is utilized for reading or writing signals. The 0-order diffraction beam 70 from the holographic optical element 52 is reflected at a polarized beamsplitter 50 and subsequently is focused on the magneto-optical recording medium 4 by an objective lens 31. Then, the polarization direction of the beam 70 is slightly rotated by virtue of Kerr effect of the magneto-optical recording medium 4.

The beam 70 reflected back and diffracted at the magneto-optical recording medium 4 again passes the objective lens 31 and, in turn, is split into two beams 701 and 702 by means of the polarized beamsplitter 50. The beam 701 having passed through the polarized beamsplitter 50 is further split by a Wollaston prism 51 into two beams 701a and 701b on the basis of the polarization direction of the beam 701.

The beams 701a and 701b are respectively converted by a converging lens 32 into converging beams, which are received by a photodetector unit 81 having two photodetectors 811 and 812. Information recorded on the magneto-optical recording medium 4 is obtained through a differential operation which performs mathematical functions on the difference between two output signals generated from photodetectors 811 and 812.

On the other hand, the beam 702 being reflected at the polarized beamsplitter 50 is entered into the holographic optical element 52 and, then, 1-order diffraction beams 702a and 702b are generated. These 1-order diffraction beams 702a and 702b are converted by a lens 30 into converging beams, which are received by a photodetector unit 82.

Figure 8A:
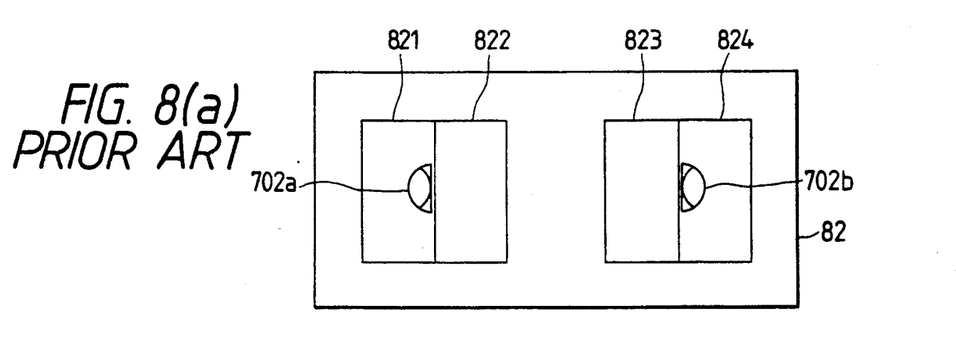
FIGS. 8(a)~8(c) are graphs respectively showing the relationship between beams and photodetector unit of the conventional optical pick-up head apparatus; and, FIG. 9 is a graph showing intensities of the information signal and the focusing (or tracking)-error signal relative to the diffraction efficiency of the O-order diffraction beam from the holographic optical element in the conventional optical pick-up head apparatus.
Figure 8B:
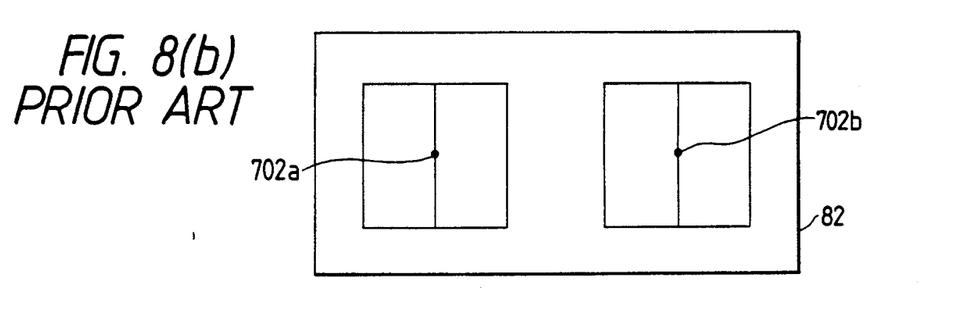
Figure 8C:
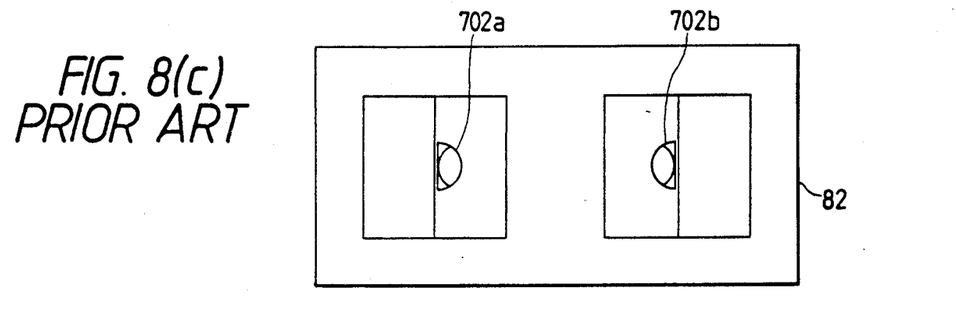

FIG. 8 shows photodetectors 821~824 of the photodetector unit 82 and their receiving images of the 1-order diffraction beams 702a and 702b supplied from the holographic optical element 52. FIG. 8(b) shows a focusing condition wherein the beam 7 emitted from the semiconductor laser source 1 accurately focuses on the magneto-optical recording medium 4. To the contrary, FIGS. 8(a) and 8(c) show defocusing conditions wherein the images are defocussed in opposite directions.

The focusing-error signal can be obtained by carrying out the differential operation based on the summation of output signals from the photodetectors 821 and 824 and the summation of output signals from the photodetectors 822 and 823. The tracking-error signal can be obtained by carrying out the differential operation based on the summation of output signals from the photodetectors 821 and 822 and the summation of output signals from the photodetectors 823 and 824. These methods are well-known as "double-knife edge method" or "push-pull method", respectively, and disclosed in detail, for example, in the U.S. Pat. No. 4,665,310.

Figure 9:
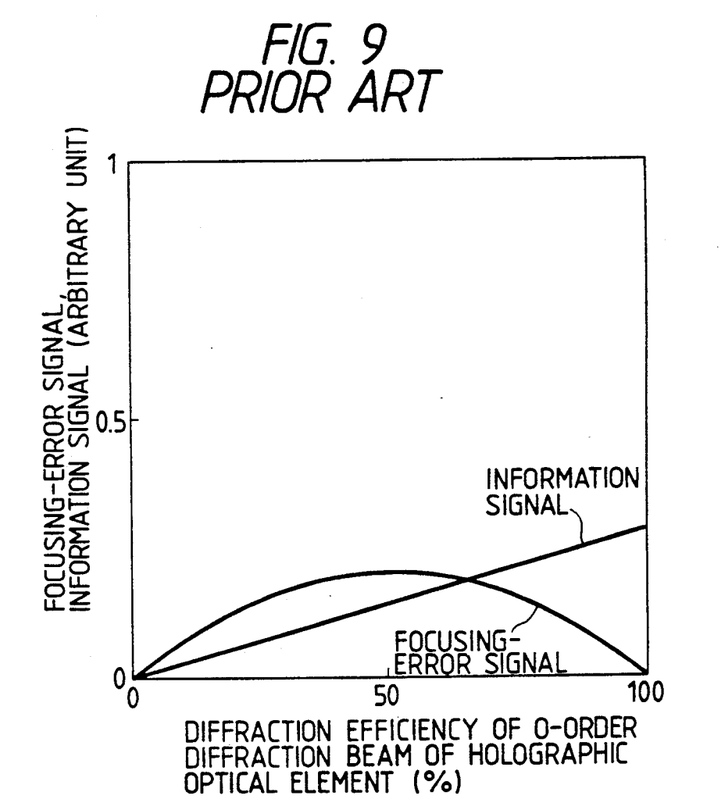

FIG. 9 shows one example of intensities of the information signal detected by the photodetector unit 81 and the focusing (or tracking)-error signal detected by the photodetector unit 82 relative to the diffraction efficiency of the 0-order diffraction beam from the holographic optical element 52. The focusing (or tracking)-error signal becomes maximum when the diffraction efficiency of the 0-order diffraction beam from the holographic optical element 52 is 50%. On the other hand, the information signal becomes maximum when the diffraction efficiency of the 0-order diffraction beam from the holographic optical element 52 is 100%.

Namely, it is impossible to realize the signal detection capable of optimizing both the focusing (or tracking)-error signal and the information signal. In other words, it is inevitable that either of these signals is deteriorated.

SUMMARY OF THE INVENTION

Accordingly, the present invention has a purpose, in view of above-described problems or disadvantages encountered in the prior art, to provide an optical pick-up head apparatus capable of detecting both the focusing (or tracking)-error signal and the information signal in the optimum condition.

In order to accomplish above purpose, a first aspect of the present invention provides an optical pick-up head apparatus comprising:

a laser source for emitting a coherent beam or a sub-monochrome color beam;

an imaging optics for receiving a beam emitted from said laser source and focusing this beam into a tiny spot on a magneto-optical recording medium;

a first optical means for splitting a beam reflected back and diffracted at the magneto-optical recording medium into first and second beams;

a second optical means for receiving said first beam split by the first optical means and further splitting said first beam into a plurality of beams of different directions in accordance with polarization direction of the first beam;

a first photodetector unit having a plurality of photodetectors for receiving said plurality of beams split by the second optical means and generating photoelectric currents in response to respective split beams;

a third optical means for receiving said second beam split by the first optical means and further splitting this beam;

a focusing-error detecting element for receiving a beam split by the third optical means and generating a beam capable of obtaining a focusing-error signal;

a second photodetector unit having a plurality of photodetectors for receiving the beam generated from said focusing-error detecting element and respectively generating photoelectric current in response to the received beam; and a polarization rotator element for rotating a polarization direction of a linearly polarized light to form another linearly polarized light having different polarization direction, disposed on an optical path between said first optical means and said third optical means to rotate polarization direction of the beam emitted from the laser source and also rotate polarization direction of the beam reflected back at the magneto-optical recording medium.

Furthermore, a second aspect of the present invention provides an optical pick-up head apparatus comprising:

a laser source for emitting a coherent beam or a sub-monochrome color beam;

an imaging optics for receiving a beam emitted from said laser source and focusing this beam into a tiny spot on a magneto-optical recording medium;

a first optical means for splitting a beam reflected back and diffracted at the magneto-optical recording medium into first and second beams;

a second optical means for receiving said first beam split by the first optical means and further splitting said first beam into a plurality of beams of different directions in accordance with polarization direction of the first beam;

a first photodetector means having a plurality of photodetectors for receiving said plurality of beams split by the second optical means and generating photoelectric currents in response to respective split beams;

a holographic optical element for receiving said second beam split by the first optical means and further generating diffraction beams having wavefronts that enable detection of focusing-error;

a second photodetector means having a plurality of photodetectors for receiving the beam generated from said holographic optical element and respectively generating photoelectric current in response to the received beam; and a polarization rotator element for rotating a polarization direction of a linearly polarized light to form another linearly polarized light having different polarization direction, disposed on an optical path between said first optical means and said holographic optical element to rotate polarization direction of the beam emitted from the laser source and also rotate polarization direction of the beam reflected back at the magneto-optical recording medium.

With this measure, it becomes possible that light quantity supplied to the first photodetector unit for detecting the information signal is adjusted to the optimum amount capable of adequately detecting the information signal and further almost all the remaining light quantity is supplied to the second photodetector unit for detecting the focusing (or tracking)-error signal. Therefore, there is no uselessness in distribution of light. That is, both the focusing (or tracking)-error signal and the information signal can be respectively detected with high intensity and excellent S/N ratio.

The above and other objects, features and advantages of the present invention will become more apparent from the following detailed description which is to be read in conjunction with the accompanying drawings.

DETAILED DESCRIPTION OF THE PREFERRED EMBODIMENTS

Hereinafter, referring now to the accompanying drawings, embodiments of the present invention is explained in detail.

FIRST EMBODIMENT

Figure 1:
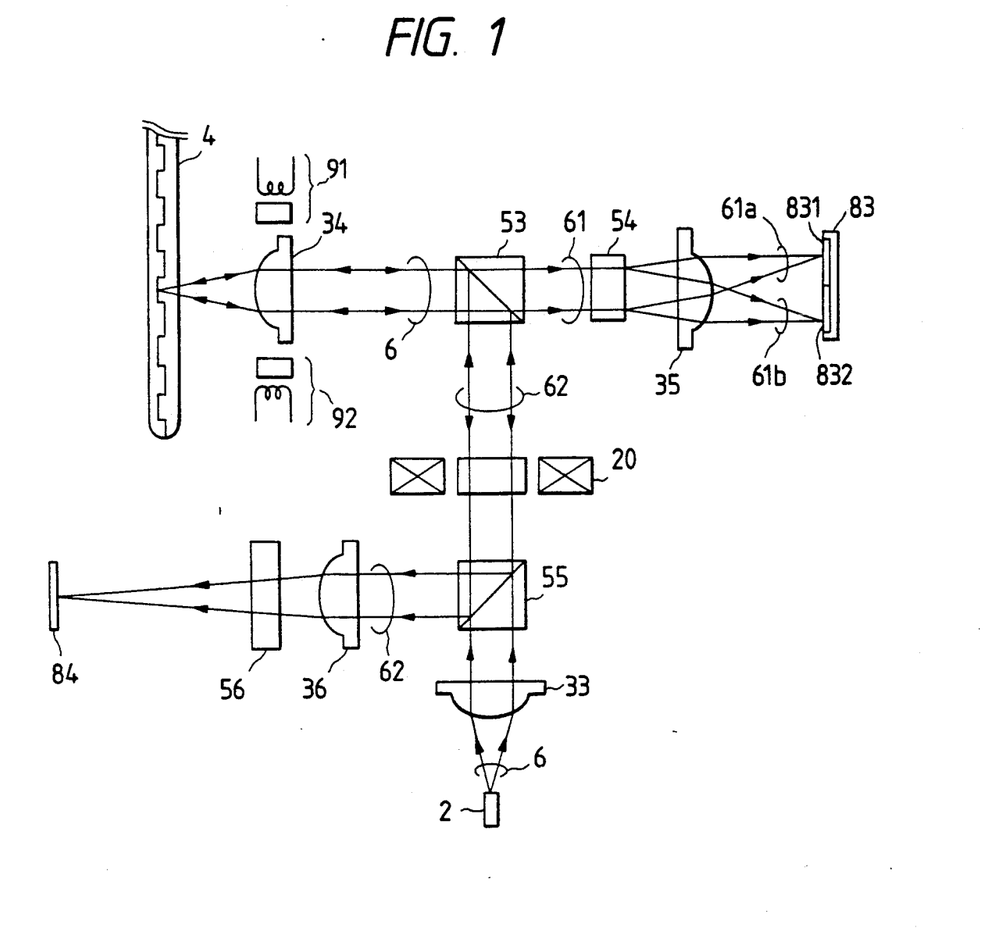
FIG. 1 is a schematic view showing a constitution of a first embodiment of an optical pick-up head apparatus in accordance with the present invention.

FIG. 1 shows a schematic constitution of an optical pick-up head apparatus as first embodiment of the present invention. In this drawing, a reference numeral 2 denotes a semiconductor laser source (having a wavelength λ of, for example, 780 nm) for emitting coherent (or sub-monochrome color) beam 6. The spherical beam 6 emitted from the semiconductor laser source 2 is converted by a collimating lens 33 into a parallel beam and, in turn, entered into a polarized beamsplitter 55.

In this case, the polarized beamsplitter 55 is set to have transmissivity of 100% and reflectivity of 0% with respect to the beam having a polarization direction parallel to that of the beam 6 emitted from the semiconductor laser source 2 and further to have transmissivity of 0% and reflectivity of 100% with respect to the beam having a polarization direction perpendicular to that of the beam 6 emitted from the semiconductor laser source 2.

Therefore, the beam 6 having been emitted from the semiconductor laser source 2 and entered into the polarized beamsplitter 55 entirely passes through the polarized beamsplitter 55. The beam 6 having passed through the polarized beamsplitter 55 is entered into a Faraday rotator 20 and, then, the polarization direction of the beam 6 is rotated by 45 degrees while passing through the Faraday rotator 20. The beam 6 is further entered into a polarized beamsplitter 53. The Faraday rotator 20 is made from Bi-substituted garnet film and permanent magnet. The polarized beamsplitter 53 is set to have reflectivity of 98% and transmissivity of 2% with respect to the beam having a polarization direction parallel to that of the beam 6 having been emitted from the semiconductor laser source 2 and having passed the Faraday rotator 20 and further to have reflectivity of 0% and transmissivity of 100% with respect to the beam having a polarization direction perpendicular to that of the beam 6 having been emitted from the semiconductor laser source 2 and having passed the Faraday rotator 20.

Therefore, the beam 6 having passed through the Faraday rotator 20 is reflected at the polarized beamsplitter 53 by 98% in its intensity. The beam 6 reflected at the polarized beamsplitter 53 is converged by an objective lens 34 on an magneto-optical recording medium 4. That is, the collimating lens 33 and the objective lens 34 constitute a part of an imaging optics which functions to receive the beam emitted from the laser source and focusses this beam into a tiny spot on a magneto-optical recording medium.

Then, by virtue of the Kerr effect of the magneto-optical recording medium 4 the polarization direction of the beam 6 is rotated.

The beam 6 having been reflected back and diffracted at the magneto-optical recording medium 4 again passes the objective lens 34 and, then, is split by the polarized beamsplitter 53 into two beams 61 and 62. That is, this polarized beamsplitter 53 functions as a first polarized beamsplitter for splitting the beam reflected back and diffracted at the magneto-optical recording medium into first and second beams.

The beam 61 having passed through the polarized beamsplitter 53 is further split by a Wollaston prism 54 into two beams 61a, 61b on the basis of its polarization direction. Namely, this Wollaston prism 54 serves as a second polarized beamsplitter for receiving the first beam split by the first polarized beamsplitter and further splitting this first beam into a plurality of beams of different directions in accordance with polarization direction of the first beam.

The beams 61a and 61b are converted by a converging lens 35 into converging beams, which are received by a photodetector unit 83 having two photodetectors 831 and 832. The photodetector unit 83 serves as a first photodetector unit having a plurality of photodetectors for receiving the plurality of beams split by the second polarized beamsplitter and generating photoelectric currents in response to respective split beams.

The information recorded on the magneto-optical recording medium 4 is taken out by executing a differential operation based on the output signals obtained from the photodetectors 831 and 832.

On the other hand, the beam 62 having been reflected at the polarized beamsplitter 53 is entered into the Faraday rotator 20 and, then, the polarization direction of the beam 62 is rotated by another 45 degrees while passing through the Faraday rotator 20. As a result, the beam 62 having passed through the Faraday rotator 20 comes to have a polarization direction perpendicular to that of the beam 6 emitted from the semiconductor laser source 2. And then, the beam 62 is entered into the polarized beamsplitter 55.

The beam 62 having entered into the polarized beamsplitter 55 is reflected by 100%. Namely, the polarized beamsplitter 55 functions as a third polarized beamsplitter for receiving the second beam split by the first polarized beamsplitter and further splitting this beam.

Then, the beams 62 is converged by a lens 36 and, after that, is applied astigmatic aberration by a cylindrical lens 56 which serves as a focusing-error detecting element. Subsequently, the beam 62 is received by a photodetector unit 84. The photodetector unit 84 serves as a second photodetector unit having a plurality of photodetectors for receiving the beam generated from the focusing-error detecting element and respectively generating photoelectric current in response to the received beam.

Figure 2A:
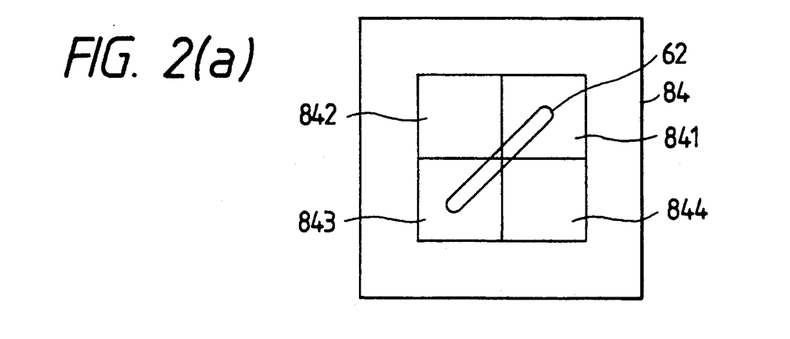
FIGS. 2(a)~2(c) are views respectively showing the relationship between beams and photodetector unit of the optical pick-up head apparatus in accordance with the present invention.
Figure 2B:
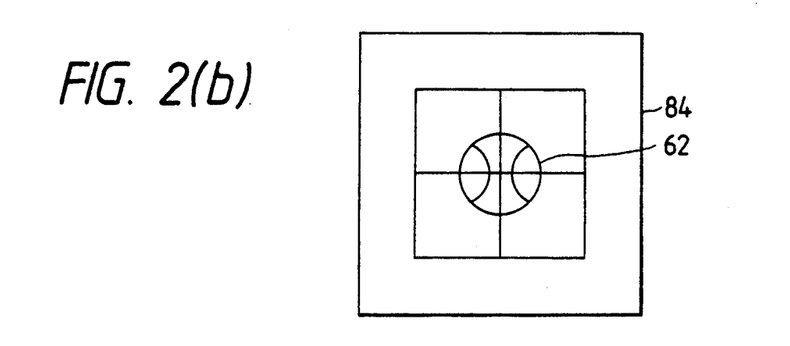
Figure 2C:
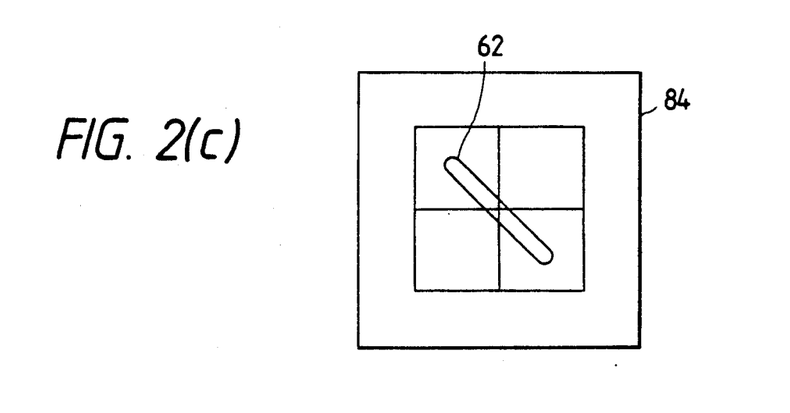

FIG. 2 shows photodetectors 841~844 of the photodetector unit 84 and their receiving images of the beam 62. FIG. 2(b) shows a focusing condition wherein the beam 6 emitted from the semiconductor laser source 2 accurately focuses on the magneto-optical recording medium 4. To the contrary, FIGS. 2(a) and 2(c) show defocusing conditions wherein the images are defocussed in opposite directions.

The focusing-error signal can be obtained by carrying out the differential operation based on the summation of output signals from the photodetectors 841 and 843 and the summation of output signals from the photodetectors 842 and 844. This focusing-error signal detection method is well-known to the public as so-called "astigmatic method". The focusing-error signal is processed into a required level by appropriate circuits such as an amplification circuit, a phase compensation circuit, a band limiter circuit, and the like. Then, the signal is supplied to an actuator 91 shown in FIG. 1 which is provided for controlling the focus. The actuator 91 controls the position of the objective lens 34 so as to adjust a focusing direction in such a manner that the focal point of the objective lens 34 is located at a desired position on the magneto-optical recording medium 4.

On the other hand, the tracking-error signal can be obtained by carrying out the differential operation based on the summation of output signals from the photodetectors 841 and 844 and output signals from the photodetectors 842 and 843. This tracking-error signal detection method is called as "push-pull method" and is well-known to the public as well as the "astigmatic method".

The tracking-error signal is processed into a required level by appropriate circuits such as an amplification circuit, a phase compensation circuit, a band limiter circuit, and the like. Then, the signal is supplied to an actuator 92 shown in FIG. 1 which is provided for controlling the tracking. The actuator 92 controls the position of the objective lens 34 so as to adjust a tracking direction in such a manner that the focal point of the objective lens 34 is located at a desired position on the magneto-optical recording medium 4.

Figure 3:
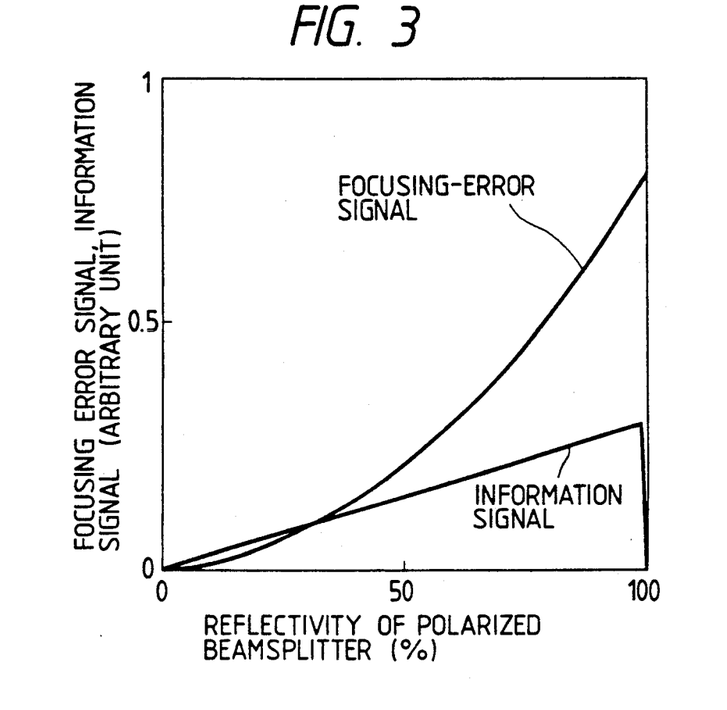
FIG. 3 is a graph showing a relationship between intensities of the information signal and the focusing (or tracking)-error signal relative to the reflectivity of the polarized beamsplitter of the optical pick-up head apparatus in accordance with the present invention.

FIG. 3 shows one example of calculated intensities of the information signal detected by the photodetector unit 83 and the focusing (or tracking)-error signal detected by the photodetector unit 84 relative to the reflectivity of the polarized beamsplitter 53 with respect to the beam which has the same polarization direction as the beam 6 having been emitted from the semiconductor laser source 2 and having passed through the Faraday rotator 20.

The focusing (or tracking)-error signal becomes maximum when the reflectivity of the polarized beamsplitter 53 is 100%. And also, the information signal becomes maximum when the reflectivity of the polarized beamsplitter 53 is nearly equal to 100%. Namely, in accordance with the present invention, it becomes possible to detect both the focusing (or tracking)-error signal and the information signal with strong signal intensities and excellent S/N ratios by adjusting the reflectivity of the polarized beamsplitter 53 to a value nearly equal to 100%. Thus, an optical pick-up head apparatus having very high reliability can be obtained.

In the case where the Kerr rotation angle of the magneto-optical recording medium 4 is $\theta$, the best information signal can be detected if the reflectivity of the polarized beamsplitter 53 is set to 1-$\tan\theta$. In this case, the focusing (or tracking)-error signal can be also obtained excellently.

Figure 4:
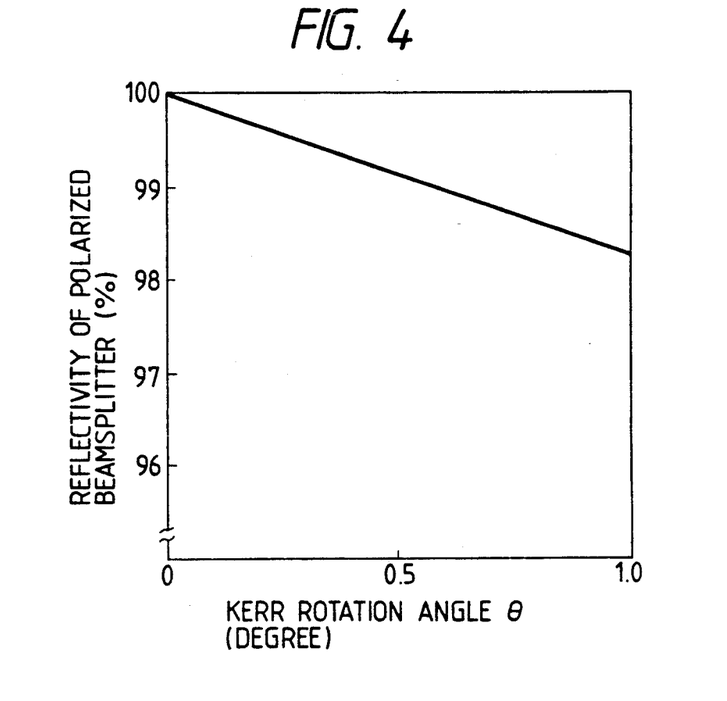
FIG. 4 is a graph showing a calculation result of the relationship between the Kerr rotation angle of the magneto-optical recording medium and the reflectivity of the polarized beamsplitter in the optical pick-up head apparatus in accordance with the present invention.

FIG. 4 shows a calculation result of the best relationship between the Kerr rotation angle $\theta$ of the magneto-optical recording medium and the reflectivity of the polarized beamsplitter 53. For example, in the case where the Kerr rotation angle $\theta$ of the magneto-optical recording medium 4 is 0.5 degree, the best condition signal can be obtained by setting the reflectivity of the polarized beamsplitter 53 to 99.2%.

Furthermore, in accordance with the present invention, it is possible to adequately determine the detection sensitivity of the focusing-error signal by varying the focal distance of the converging lens 36. Furthermore, utilization efficiency of the spherical beam 6 emitted from the semiconductor laser source 2 can be properly set by changing the focal distance of the collimating lens 33. Therefore, the optical pick-up head apparatus in accordance with the present invention can realize the optimum characteristics required from the system into which this apparatus is installed. Thus, the system adopting the optical pick-up head apparatus in accordance with the present invention comes to possess a very high fidelity.

Moreover, the present embodiment adopts the Faraday rotator as an optical element for rotating the polarization direction of beam. The Faraday rotator functions as an optical element that rotates a polarization direction of a linearly polarized light by use of the Faraday effect to form another linearly polarized light having different polarization direction. Accordingly, it is needless to say that other optical elements that can rotate the polarization direction of beam in the same manner by use of other physical phenomenons, for example a pockelscell, can be also adopted as well as the Faraday rotator.

SECOND EMBODIMENT

Figure 5:
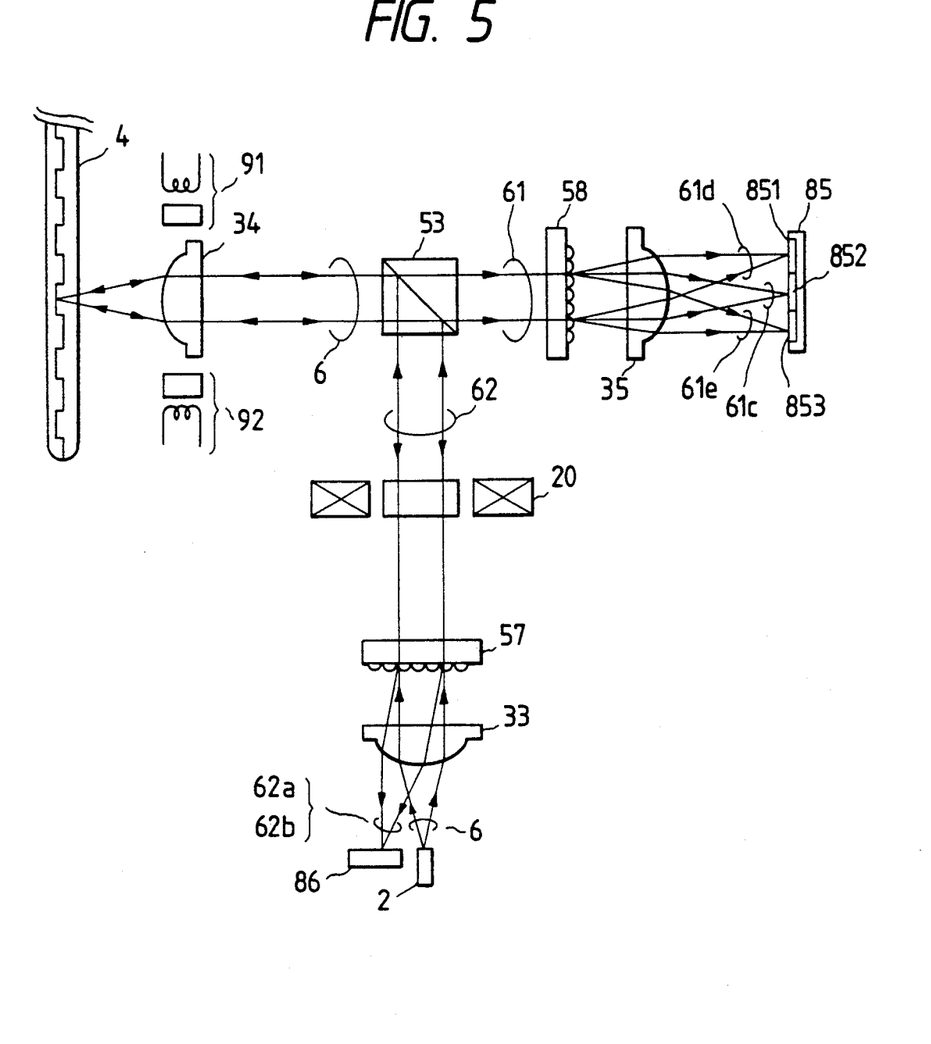
FIG. 5 is a view showing a second embodiment of the optical pick-up head apparatus in accordance with the present invention.

FIG. 5 shows a second embodiment of the present invention. The same components as those disclosed in the first embodiment are suffixed by the same reference numerals. In this second embodiment, a holographic optical element 57 is used instead of the polarized beamsplitter 55 and the cylindrical lens 56 used in the first embodiment, and further, a diffraction grating 58 is used instead of the Wollaston prism 54. Also, the photodetector unit 83 is substituted by a photodetector unit 85 and the photodetector unit 84 is substituted by a photodetector unit 86. Moreover, the lens 33 in this second embodiment functions as the lens 36 as well as the lens 33 itself of the first embodiment.

The holographic optical element 57 and the diffraction grating 58 are respectively constituted by an optical medium having polarization anisotropy in its refractive index. In this embodiment, the holographic optical element 57 and the diffraction grating 58 are made from the proton-exchanged Lithium Niobate. The holographic optical element and its manufacturing method using the optical medium having polarization anisotropy in its refractive index are disclosed, for example, in the Unexamined Japanese Patent Application No. 63-26604, the Unexamined Japanese Patent Application No. 63-241735, and so on. Accordingly, their details should be referred to these publications and, thus, the explanation is omitted here.

The spherical beam 6 emitted from the semiconductor laser source 2 is converted by the collimating lens 33 into a parallel beam and, in turn, entered into the holographic optical element 57. In this case, the holographic optical element 57 is made of a holographic optical element having polarization anisotropy and being blazed to have 100% diffraction efficiency of the 0-order diffraction beam with respect to the beam having a polarized direction parallel to that of the beam 6 emitted from the semiconductor laser source 2 and also to have 0% diffraction efficiency of the 0-order diffraction beam and approximately 100% diffraction efficiency of the 1-order diffraction beam with respect to the beam having a polarized direction normal to that of the beam 6 emitted from the semiconductor laser source 2.

The beam 6 having been emitted from the semiconductor laser source 2 and entered into the holographic optical element 57 entirely passes through the holographic optical element 57. The beam 6 having passed through the holographic optical element 57 is entered into the Faraday rotator 20 and, then, its polarization direction is rotated by 45 degrees while passing through the Faraday rotator 20. Then, the beam 6 is entered into the polarized beamsplitter 53. The Faraday rotator is made from Bi-substituted garnet film and permanent magnet.

The polarized beamsplitter 53 is set to have reflectivity of 98% and transmissivity of 2% with respect to the beam having the same polarization direction of the beam 6 having been emitted from the semiconductor laser source 2 and having passed the Faraday rotator 20 and further to have reflectivity of 0% and transmissivity of 100% with respect to the beam having a polarization direction perpendicular to the beam 6 having been emitted from the semiconductor laser source 2 and having passed the Faraday rotator 20.

Therefore, the beam 6 having passed the Faraday rotator 20 is reflected at the polarized beamsplitter 53 by 98% in its intensity. The beam 6 reflected at the polarized beamsplitter 53 is converged by the objective lens 34 on the magneto-optical recording medium 4. Then, by virtue of the Kerr effect of the magneto-optical recording medium 4 the polarization direction of the beam 6 is rotated.

The beam 6 having been reflected back and diffracted at the magneto-optical recording medium 4 again passes the objective lens 34 and, then, is split by the polarized beamsplitter 53 into two beams 61 and 62. That is, the polarized beamsplitter 53 functions as the first polarized beamsplitter for splitting a beam reflected back and diffracted at the magneto-optical recording medium into first and second beams, as well as the first embodiment.

The beam 61 having passed through the polarized beamsplitter 53 is further split by the diffraction grating 58 into a 0-order diffraction beam 61c and two 1-order diffraction beams 61d, 61e on the basis of its polarization direction. That is, the diffraction grating 58 serves as a diffraction grating for receiving the first beam split by the first polarized beamsplitter and further splitting this first beam into 0-order diffraction beam and 1-order diffraction beams in accordance with polarization direction of the first beam.

The 0-order diffraction beam 61c and two 1-order diffraction beams 61d and 61e are converted by the converging lens 35 into converging beams, which are received by a photodetector unit 85 having three photodetectors 851, 852, and 853. That is, this photodetector unit 85 functions as a third photodetector unit having a plurality of photodetectors for receiving the 0-order diffraction beam and 1-order diffraction beams split by the diffraction grating and generating photoelectric currents in response to respective diffraction beams.

Furthermore, the diffraction grating 58 is designed to have 0% diffraction efficiency of 0-order diffraction beam and approximately 40% diffraction efficiency of 1-order diffraction beam with respect to a beam having a certain polarization direction and also to have 100% diffraction efficiency of 0-order diffraction beam with respect to a beam having a polarization direction perpendicular to the above-described certain polarization direction.

The diffraction grating 58 is disposed in such a manner that the beam 6 having been emitted from the semiconductor laser source 2 and then passed the Faraday rotator 20 has a polarization direction inclined by 45 degrees from the polarization direction with which the diffraction efficiency of the 0-order diffraction beam of the diffraction grating 58 becomes 100%. The 0-order diffraction beam 61c from the diffraction grating 58 is received by the photodetector 852 and the 1-order diffraction beams 61d, 61e are received by the photodetectors 851 and 853.

The information recorded on the magneto-optical recording medium 4 is taken out by executing a differential operation using the outputs obtained from the output signal from the photodetector 852 and the summation of the output signals from the photodetectors 851 and 853.

On the other hand, the beam 62 having been reflected at the polarized beamsplitter 53 is entered into the Faraday rotator 20 and, then, its polarization direction is rotated by another 45 degrees while passing through the Faraday rotator 20. As a result, the beam 62 having passed the Faraday rotator 20 comes to have a polarization direction perpendicular to that of the beam 6 emitted from the semiconductor laser source 2. And then, the beam 62 is entered into the holographic optical element 57.

The beam 62 having entered into the holographic optical element 57 is reflected by 100% to generate two 1-order diffraction beams 62a and 62b. That is, the holographic optical element 57 serves as a holographic optical element for receiving the second beam split by the first polarized beamsplitter and further generating two 1-order diffraction beams.

These two diffraction beams 62a and 62b are converged by the lens 33 and, in turn, received by the photodetector unit 86. Namely, the photodetector unit 86 serves as a fourth photodetector unit having a plurality of photodetectors for receiving the diffraction beams generated from said holographic optical element and respectively generating photoelectric current in response to the received diffraction beam.

A pattern on the holographic optical element 57 is designed such that, in the condition that the beam 6 emitted from the semiconductor laser source 2 focuses on the magneto-optical recording medium 4, their beam diameters on the photodetector unit 86 become equal with each other but one of focal points of these two 1-order diffraction beams 62a, 62b is positioned in front of the photodetector unit 86 and the other is positioned behind the photodetector unit 86. A method for designing such a holographic optical element is disclosed, for example, in the U.S. Pat. No. 4,929,823.

Figure 6A:
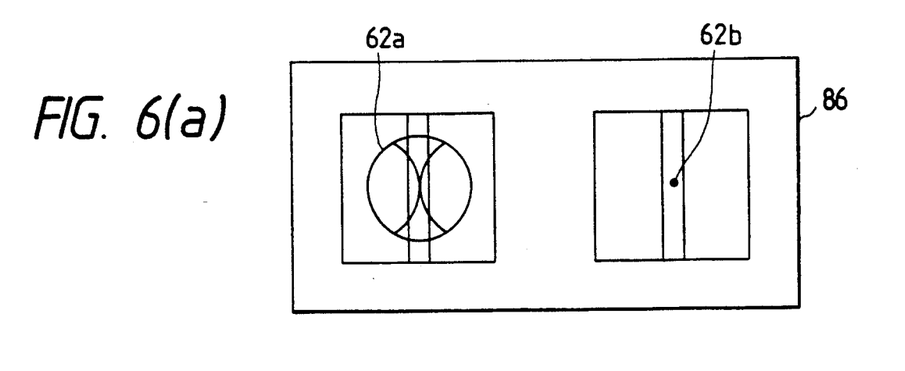
FIGS. 6(a)~6(c) are graphs respectively showing the relationship between beams and photodetector unit of the optical pick-up head apparatus in accordance with the present invention.
Figure 6B:
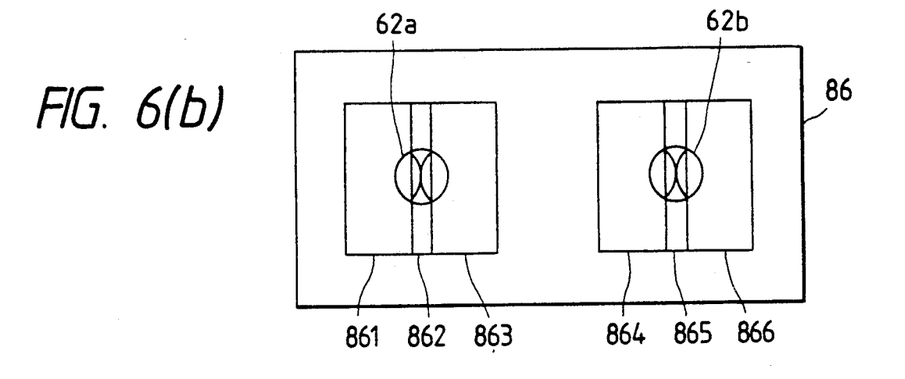
Figure 6C:
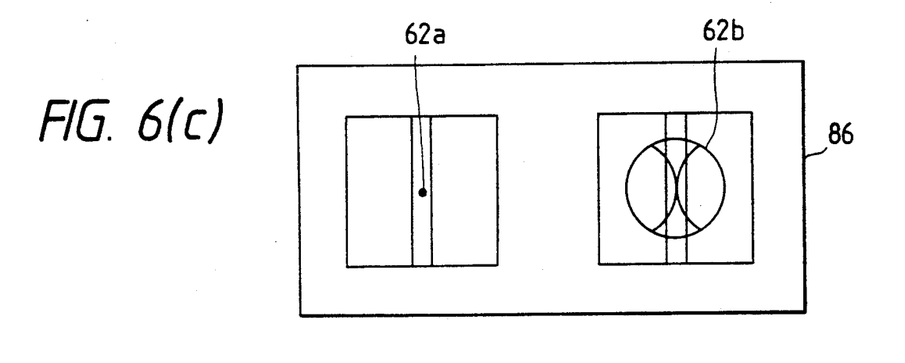

FIG. 6 shows photodetectors 6861~866 of the photodetector unit 86 and their receiving images of the 1-order diffraction beams 62a and 62b. FIG. 6(b) shows a focusing condition wherein the beam 6 emitted from the semiconductor laser source 2 accurately focuses on the magneto-optical recording medium 4. To the contrary, FIGS. 6(a) and 6(c) show defocusing conditions wherein the images are defocussed in opposite directions.

The focusing-error signal can be obtained, for example, by carrying out a differential operation based on the output signals obtained from the photodetectors 862 and 865. This focusing-error signal detection method is well-known to the public as "spot-size-detection method" as well as the "astigmatic method".

Furthermore, the tracking-error signal can be obtained, for example, by carrying out a differential operation based on the output signals obtained from the photodetectors 861 and 863, or by carrying out a differential operation based on the output signals obtained from the photodetectors 864 and 866. This tracking-error signal detection method belongs to the same "push-pull method" as the first embodiment.

The focusing-error signal and the tracking-error signal are respectively processed into a required level by appropriate circuits such as an amplification circuit, a phase compensation circuit, a band limiter circuit, and the like. Then, thus processed signals are supplied to the actuator 91 of FIG. 5 provided for the control of focus and to the actuator 92 of FIG. 5 provided for the control of tracking. These actuators 91 and 92 control the position of the objective lens 34 in such a manner that the focal point of the objective lens 34 is located at a desired position on the magneto-optical recording medium 4.

In this embodiment, as well as the first embodiment, it becomes possible to realize an excellent signal detection capable of optimizing both the focusing (or tracking)-error signal and the information signal. Thus, an optical pick-up head apparatus having high reliability can be obtained.

Furthermore, the holographic optical element can be mass-produced at low cost and also manufactured into a thinner plate configuration if compared with the polarized beamsplitter. Therefore, cost reduction, light-weight, compactness can be realized by using the holographic optical element having polarization anisotropy instead of the polarized beamsplitter or Wollaston prism.

Though the present embodiment is exemplarily explained by use of the diffraction grating or the holographic optical element which are made of the optical medium having polarization anisotropy in its refractive index, it is also possible to use, for example, a diffraction grating or a holographic optical element whose grating periods are shortened to the degree of the wavelength of laser source so as to have polarization anisotropy in the diffraction efficiency.

Furthermore, by using the holographic optical element, the photodetector unit 82 can be easily disposed adjacent to the semiconductor laser source 2. And, therefore, the photodetector unit 86 can be accommodated in the same package as the semiconductor laser source 2. In such a case, relationship between the position of the semiconductor laser source 2 and the position of the photodetector unit are very stably maintained. Accordingly, the focusing control can be also stably carried out in this optical pick-up head. As a result, the optical pick-up head can improve its reliability against environmental variation such as aging phenomenon or temperature change.

Moreover, the present embodiment adopts the Faraday rotator as an optical element for rotating the polarization direction of beam. The Faraday rotator functions as an optical element that rotates a polarization direction of a linearly polarized light by use of the Faraday effect to form another linearly polarized light having different polarization direction. Accordingly, it is needless to say that other optical elements that can rotate the polarization direction of beam in the same manner by use of other physical phenomenons, for example a pockelscell, can be also adopted as well as the Faraday rotator.

Still further, as is apparent from the foregoing description, it is needless to say that the signal detection method in accordance with the present invention is not limited to any particular method and, therefore, other signal detection methods, for example, "knife-edge method" or "phase-difference method" can be used for the detection of the focusing-error signals and further "3-beam method", "phase-difference method", and the like can be used for the detection of the tracking-error signals by constituting the optical system in a predetermined required fashion.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An optical pick-up head apparatus comprising:
a laser source for emitting a going beam;
an imaging optics for receiving said going beam emitted from said laser source and focusing this beam onto a tiny spot of a magneto-optical recording medium;
first optical means for splitting a returning beam diffracted at the magneto-optical recording medium and reflected back through said imaging optics into first and second returning beams, said first optical means having polarization anisotropy;
second optical means for receiving said first returning beam split by the first optical means and further splitting said first returning beam into a plurality of first detecting beams of different directions in accordance with polarization direction of the first returning beam;
a first photodetector unit having a plurality of photodetectors for receiving said plurality of first detecting beams split by the second optical means and generating photoelectric currents in response to respective first detecting beams;
third optical means for receiving said second returning beam split by the first optical means and further splitting this beam, said third optical means having polarization anisotropy;
a focusing-error detecting element for receiving said beam split by the third optical means and generating a second detecting beam for obtaining a focusing-error signal;
a second photodetector unit having a plurality of photodetectors for receiving said second detecting beam generated from said focusing-error detecting element and respectively generating photoelectric current in response to said second detecting beam; and
a polarization rotator element, disposed on an optical path between said first optical means and said third optical means to rotate polarization direction of the going beam emitted from the laser source and also rotate polarization direction of the returning beam reflected back at the magneto-optical recording medium, thereby differentiating the polarization directions of said going and returning beams;
wherein said going beam emitted from said laser source advances to said magneto-optical recording medium via a going optical path passing through said third optical means, said polarization rotator element, said first optical means, and said imaging optics, and the returning beam reflected at the magneto-optical recording medium returns to said second photodetector unit via a returning optical path passing through said imaging optics, said first optical means, said polarization rotator element, said third optical means, and said focusing error detecting element.

2. An optical pick-up head apparatus in accordance with claim 1 in which any one of said first, second, and third optical means is a diffraction optical element.

3. An optical pick-up head apparatus in accordance with claim 1 in which any one of said first, second, and third optical means is an optical element having polarization anisotropy in its refractive index, reflectivity or transmissivity.

4. An optical pick-up head apparatus comprising:
a laser source for emitting a going beam;
an imaging optics for receiving said going beam emitted from said laser source and focusing this beam onto a tiny spot of a magneto-optical recording medium;
first optical means for splitting a returning beam diffracted at the magneto-optical recording medium and reflected back through said imaging optics into first and second returning beams, said first optical means having polarization anisotropy;
second optical means for receiving said first returning beam split by the first optical means and further splitting said first returning beam into a plurality of first detecting beams of different directions in accordance with polarization direction of the first returning beam;
first photodetector means having a plurality of photodetectors for receiving said plurality of first detecting beams split by the second optical means and generating photoelectric currents in response to respective first detecting beams;

a holographic optical element for receiving said second returning beam split by the first optical means and further generating diffraction beams having wavefronts which serve as second detecting beams for detection of focusing-error;

second photodetector means having a plurality of photodetectors for receiving said second detecting beams generated from said holographic optical element and respectively generating photoelectric current in response to said second detecting beam; and a polarization rotator element, disposed on an optical path between said first optical means and said holographic optical element to rotate polarization direction of the going beam emitted from the laser source and also rotate polarization direction of the returning beam reflected back at the magneto-optical recording medium, thereby differentiating the polarization directions of said going and returning beams wherein said going beam emitted from said laser source advances to said magneto-optical recording medium via a going optical path passing through said holographic optical element, said polarization rotator element, said first optical means, and said imaging optics, and the returning beam reflected at the magneto-optical recording medium returns to said second photodetector means via a returning optical path passing through said imaging optics, said first optical means, said polarization rotator element, and said holographic optical element.

5. An optical pick-up head apparatus in accordance with claim 4 in which said first or second optical means is a diffraction optical element.

6. An optical pick-up head apparatus in accordance with claim 4 in which said first or second optical means is an optical element having polarization anisotropy in its refractive index, reflectivity or transmissivity.

7. An optical pick-up head apparatus in accordance with claim 4 in which said holographic optical element generates two wavefronts of 1-order diffraction beams having different focal points with each other in such a pattern that, in the condition that the beam emitted from the laser source focuses on the magneto-optical recording medium, diameters of these two 1-order diffraction beams become equal with each other on the second photodetector unit but one of focal points of these two 1-order diffraction beams is positioned in front of the second photodetector unit and the other is positioned behind the second photodetector unit.

8. An optical pick-up head apparatus in accordance with any one of claims 1-7 in which any one of said first to third optical means is a diffraction optical element, and said diffraction optical element or said holographic optical element has a grating period less than a wavelength of the laser source.

9. An optical pick-up head apparatus in accordance with any one of claims 1-7 in which any one of said first to third optical means is a diffraction optical element, and said diffraction optical element or said holographic optical element is made from the proton-exchanged Lithium Niobate.

10. An optical pick-up head apparatus in accordance with claim 1 or 4 in which said polarization rotator element is a pockelscell.

11. An optical pick-up head apparatus in accordance with claim 1 or 4 in which said polarization rotator element is a Faraday rotator.

12. An optical pick-up head apparatus in accordance with claim 11 in which said Faraday rotator is made from Bi-substituted garnet film and permanent magnet.

13. An optical pick-up head apparatus in accordance with claim 1 or 4 in which said polarization rotator element rotates the polarization direction of the beam by 45 degrees while the beam passes through the polarization rotator element.

14. An optical pick-up head apparatus in accordance with claim 1 or 4 in which the second returning beam being entered into the polarization rotator element after having reflected back at the magneto-optical recording medium comes to have a polarization direction perpendicular to that of the beam emitted from the laser source.

15. An optical pick-up head apparatus in accordance with claim 1 or 4 in which said second optical means is a Wollaston prism.

16. An optical pick-up head apparatus in accordance with claim 1 or 4 in which information signals recorded on the magneto-optical recording medium are taken out by executing a differential operation based on the output signals obtained from the photodetectors of said first photodetector unit.

17. An optical pick-up head apparatus in accordance with claim 1 or 4 in which focusing- and/or tracking-error signals are obtained by executing a differential operation based on the output signals obtained from the photodetectors of said second photodetector unit.

18. An optical pick-up head apparatus in accordance with claim 1 or 4 in which focusing- and/or tracking-error signals obtained by said second photodetector unit are supplied to an actuator as control signals for adjusting the focal point of an objective lens constituting said imaging optics.

19. An optical pick-up head apparatus in accordance with claim 1 or 4 in which, if Kerr rotation angle of the magneto-optical recording medium is defined as $\theta$ said first optical means for splitting the beam reflected back and diffracted at the magneto-optical recording medium has reflectivity, transmissivity, or diffraction efficiency of approximately $1-\tan\theta$ with respect to one polarization direction for generating said first beam.

* * * * *